United States Patent
Baum et al.

(10) Patent No.: US 7,508,842 B2
(45) Date of Patent: Mar. 24, 2009

(54) METHOD AND APPARATUS FOR PILOT SIGNAL TRANSMISSION

(75) Inventors: Kevin L. Baum, Rolling Meadows, IL (US); Brian K. Classon, Palatine, IL (US); Vijay Nangia, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 701 days.

(21) Appl. No.: 11/207,457

(22) Filed: Aug. 18, 2005

(65) Prior Publication Data

US 2007/0041311 A1 Feb. 22, 2007

(51) Int. Cl.
*H04J 3/16* (2006.01)
*H04J 3/22* (2006.01)
*H04B 3/10* (2006.01)

(52) U.S. Cl. .............. 370/468; 370/491; 370/465

(58) Field of Classification Search ......... 370/208, 370/260, 329, 330, 335, 431, 434, 437, 46, 370/468, 480, 491, 495, 496, 500; 455/434
See application file for complete search history.

(56) References Cited

U.S. PATENT DOCUMENTS

| | | | |
|---|---|---|---|
| 5,299,192 A | | 3/1994 | Guo et al. |
| 6,904,550 B2 * | | 6/2005 | Sibecas et al. ............. 714/714 |
| 2002/0159430 A1 * | | 10/2002 | Atarashi et al. ............. 370/347 |
| 2003/0072254 A1 * | | 4/2003 | Ma et al. .................... 370/208 |
| 2003/0179776 A1 * | | 9/2003 | Sumasu et al. ............. 370/491 |
| 2004/0109432 A1 * | | 6/2004 | Laroia et al. ................ 370/343 |
| 2004/0240572 A1 * | | 12/2004 | Brutel et al. ................ 375/260 |
| 2004/0246886 A1 * | | 12/2004 | Mege et al. ................. 370/203 |
| 2005/0099939 A1 * | | 5/2005 | Huh et al. ................... 370/210 |
| 2005/0174929 A1 * | | 8/2005 | Hayashi et al. ............. 370/208 |
| 2005/0243939 A1 * | | 11/2005 | Jung et al. .................. 375/260 |
| 2005/0249181 A1 * | | 11/2005 | Vijayan et al. ............. 370/344 |
| 2005/0286408 A1 | | 12/2005 | Jin et al. |
| 2006/0018287 A1 * | | 1/2006 | Walton et al. ............... 370/334 |
| 2006/0209973 A1 * | | 9/2006 | Gorokhov et al. ........... 375/260 |
| 2006/0251036 A1 * | | 11/2006 | Gollamudi et al. .......... 370/342 |
| 2007/0002898 A1 * | | 1/2007 | Boariu et al. ............... 370/468 |
| 2008/0101214 A1 * | | 5/2008 | Jitsukawa et al. ........... 370/208 |

FOREIGN PATENT DOCUMENTS

WO WO 2004/056022 * 7/2004

* cited by examiner

*Primary Examiner*—Chi H Pham
*Assistant Examiner*—Warner Wong (57) ABSTRACT

A method and apparatus for pilot signal transmission is disclosed herein. In particular, a pilot transmission scheme is utilized where pilot sub-carrier bandwidth differs from data sub-carrier bandwidth. Because some user's data sub-carriers will no longer have the user's pilot sub-carriers adjacent to them, the set, or pattern of sub-carriers used by the pilot blocks changes at least once in a burst. Changing the pilot block pattern (the set of occupied pilot block sub-carriers) at least once in the burst serves to increase the frequency proximity of occupied data sub-carriers to occupied pilot sub-carriers in the burst.

19 Claims, 8 Drawing Sheets

FIG. 1
Prior-art

METHOD AND APPARATUS FOR PILOT SIGNAL TRANSMISSION

FIELD OF THE INVENTION

The present invention relates generally to pilot signal transmission, and in particular to a method and apparatus for pilot signal transmission in a communication system.

BACKGROUND OF THE INVENTION

A pilot signal is commonly used for communication systems to enable a receiver to perform a number of critical functions, including but not limited to, the acquisition and tracking of timing and frequency synchronization, the estimation and tracking of desired channels for subsequent demodulation and decoding of the information data, the estimation and monitoring of the characteristics of other channels for handoff, interference suppression, etc. Several pilot schemes can be utilized by communication systems, and typically comprise the transmission of a known sequence at known time intervals. A receiver, knowing the sequence only or knowing the sequence and time interval in advance, utilizes this information to perform the abovementioned functions.

For the uplink of future broadband systems, single-carrier based approaches with orthogonal frequency division are of interest. These approaches, particularly Interleaved Frequency Division Multiple Access (IFDMA) and its frequency-domain related variant known as DFT-Spread-OFDM (DFT-SOFDM), are attractive because of their low peak-to-average power ratio (PAPR), frequency domain orthogonality between users, and low-complexity frequency domain equalization.

Figure 1:
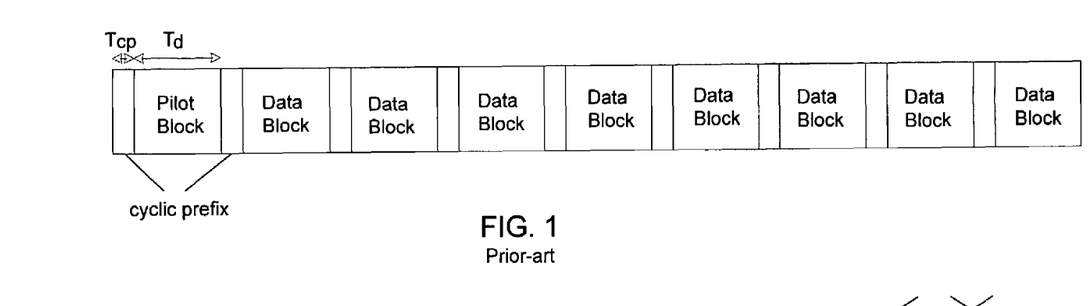
FIG. 1 illustrates data blocks and a pilot block in an IFDMA system or a DFT-SOFDM system.

In order to retain the low PAPR property of IFDMA/DFT-SOFDM, only a single IFDMA code should be transmitted by each user. This leads to restrictions on the pilot symbol format. In particular, a time division multiplexed (TDM) pilot block should be used, where data and pilots of a particular user are not mixed within the same IFDMA block. This allows the low PAPR property to be preserved and also enables the pilot to remain orthogonal from the data in multipath channels, since there is conventionally a cyclic prefix between blocks. An example is shown in FIG. 1, where an IFDMA pilot block and subsequent IFDMA data blocks for a transmission frame or burst are shown.

While the TDM pilot approach is attractive for PAPR and pilot orthogonality, it limits the granularity available for specifying the pilot overhead, especially when a transmission frame or burst has a small number of IFDMA blocks. A second issue is that the pilot configuration remains fixed and is not adapted to the changing channel conditions. Therefore a need exists for a method and apparatus for pilot signal transmission that alleviates the above-mentioned problems.

DETAILED DESCRIPTION OF THE DRAWINGS

To address the above-mentioned need, a method and apparatus for pilot signal transmission is disclosed herein. In particular, a pilot transmission scheme is utilized where pilot sub-carrier bandwidth differs from data sub-carrier bandwidth. Because some user's data sub-carriers will no longer have the user's pilot sub-carriers adjacent to them, the set, or pattern of sub-carriers used by the pilot blocks changes at least once in a burst. Changing the pilot block pattern (the set of occupied pilot block sub-carriers) at least once in the burst serves to increase the frequency proximity of occupied data sub-carriers to occupied pilot sub-carriers in the burst.

Figure 2:
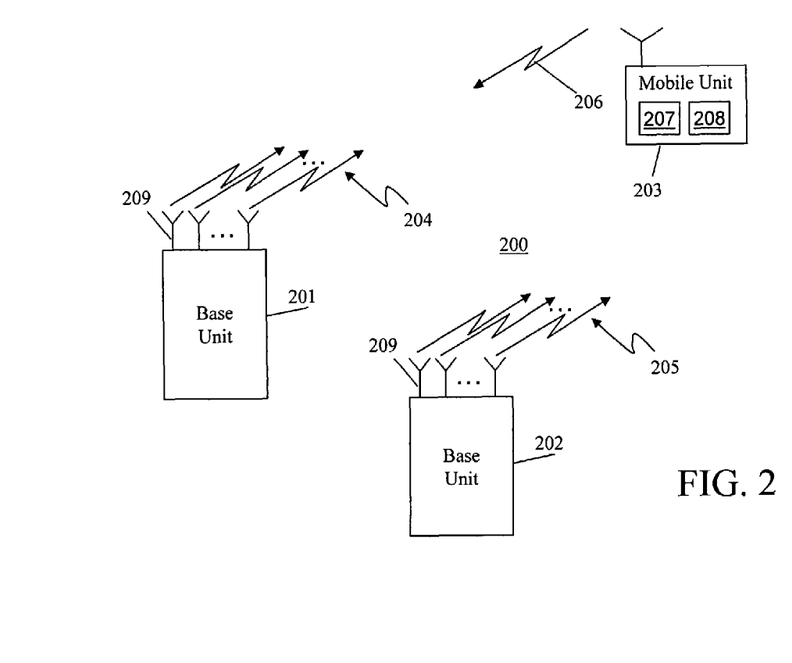
FIG. 2 is a block diagram of a communication system that utilizes pilot transmissions.

Turning now to the drawings, where like numerals designate like components, FIG. 2 is a block diagram of communication system 200 that utilizes pilot transmissions. Communication system 200 preferably utilizes a next generation single-carrier based FDMA architecture for uplink transmissions 206, such as interleaved FDMA (IFDMA) or DFT-spread OFDM (DFT-SOFDM). While these can be classified as single-carrier based transmission schemes with a much lower peak-to average power ratio than OFDM, they can also be classified as multicarrier schemes in the present invention because they are block-oriented like OFDM and can be configured to occupy only a certain set of "sub-carriers" in the frequency domain like OFDM. Thus IFDMA and DFT-SOFDM can be classified as both single-carrier and multicarrier since they have single carrier characteristics in the time domain and multicarrier characteristics in the frequency domain. On top of the baseline transmission scheme, the architecture may also include the use of spreading techniques such as direct-sequence CDMA (DS-CDMA), multi-carrier CDMA (MC-CDMA), multi-carrier direct sequence CDMA (MC-DS-CDMA), Orthogonal Frequency and Code Division Multiplexing (OFCDM) with one or two dimensional spreading, or simpler time and/or frequency division multiplexing/multiple access techniques, or a combination of these various techniques.

Figure 3:
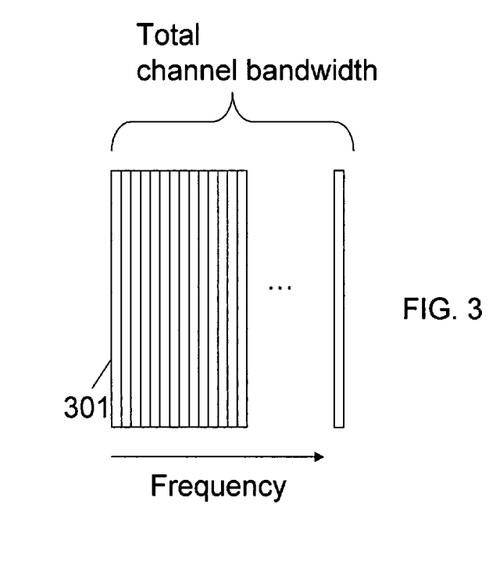
FIG. 3 illustrates multiple sub-carrier use in an IFDMA system or a DFT-SOFDM system.

As one of ordinary skill in the art will recognize, even though IFDMA and DFT-SOFDM can be seen as single-carrier-based schemes, during operation of an IFDMA system or a DFT-SOFDM system, multiple sub-carriers (e.g., 768 sub-carriers) are utilized to transmit wideband data. This is illustrated in FIG. 3. As shown in FIG. 3 the wideband channel is divided into many narrow frequency bands (sub-carriers) 301, with data being transmitted in parallel on sub-carriers 301. However, a difference between OFDM and IFDMA/DFT-SOFDM is that in OFDM each data symbol is mapped to a particular sub-carrier, whilst in IFDMA/DFT-SOFDM a portion of each data symbol is present on every sub-carrier. Hence in IFDMA/DFT-SOFDM, each occupied sub-carrier contains a mixture of multiple data symbols.

Returning to FIG. 2, communication system 200 includes base unit 201 and 202, and remote unit 203. A base unit comprises a transmitter and receiver that serve a number of remote units within a sector. A remote unit may also be referred to as a subscriber unit, a mobile unit, user equipment, a user, a terminal, a subscriber station, or similar terminologies from the art. As known in the art, the entire physical area served by the communication network may be divided into cells, and each cell may comprise one or more sectors. When multiple antennas 209 are used to serve each sector to provide various advanced communication modes (e.g., adaptive beamforming, transmit diversity, transmit SDMA, and multiple stream transmission, etc.), multiple base units can be deployed. These base units within a sector may be highly integrated and may share various hardware and software components. For example, all base units co-located together to serve a cell can constitute what is traditionally known as a base station. Base units 201 and 202 transmit downlink communication signals 204 and 205 to serving remote units on at least a portion of the same resources (time, frequency, or both). Remote unit 203 communicates with one or more base units 201 and 202 via uplink communication signal 206.

It should be noted that while only two base units and a single remote unit are illustrated in FIG. 2, one of ordinary skill in the art will recognize that typical communication systems comprise many base units in simultaneous communication with many remote units. It should also be noted that while the present invention is described primarily for the case of uplink transmission from a mobile unit to a base station, the invention is also applicable to downlink transmissions from base stations to mobile units. A base unit or a remote unit may be referred to more generally as a communication unit.

As discussed above, pilot assisted modulation is commonly used to aid in many functions such as channel estimation for subsequent demodulation of transmitted signals. With this in mind, mobile unit 203 transmits known sequences at known time intervals as part of their uplink transmissions. Any base station, knowing the sequence and time interval, utilizes this information in demodulating/decoding the transmissions. Thus, each mobile/remote unit within communication system 200 comprises pilot channel circuitry 207 that transmits one or more pilot sequences along with data channel circuitry 208 transmitting data.

As discussed above, while the TDM pilot approach is attractive for PAPR and pilot orthogonality, it limits the granularity available for adjusting the pilot overhead. Additionally, the pilot remains fixed and is not adapted to the changing channel conditions. In order to address the first issue, a finer granularity is provided for controlling the pilot overhead. Particularly, a shorter block duration is used for the pilot block than for the data block.

However, as a consequence of using a shorter block length for pilot blocks than data blocks, the sub-carrier bandwidth and the occupied sub-carrier spacing for the pilot block becomes larger than the sub-carrier bandwidth and the occupied sub-carrier spacing for the data block, assuming the same IFDMA repetition factor is used for both the pilot block and the data block. In this case, if the pilot block length (excluding cyclic prefix) is Tp and the data block length (excluding cyclic prefix) is Td, the sub-carrier bandwidth and the occupied sub-carrier spacing for the pilot block is Td/Tp times the sub-carrier bandwidth and the occupied sub-carrier spacing for the data block, respectively. This complicates the channel estimation process because the channel estimate for many of the data sub-carriers needs to be determined by frequency interpolation, since there is no pilot information present on many of the sub-carrier frequencies used for data.

A more serious problem occurs when the IFDMA repetition factor becomes large enough that the spacing between occupied sub-carriers on the pilot block exceeds the coherence bandwidth of the multi-path communication channel. In this situation, the channel estimate can no longer be interpolated in frequency, making pilot-based channel estimation for data detection infeasible.

The present invention enables larger IFDMA repetition factors to be used for a given coherence bandwidth by including more than one pilot block per burst, and by changing the set of sub-carriers used by the pilot blocks at least once in the burst. Changing the pilot block pattern (the set of occupied pilot block sub-carriers) at least once in the burst serves to increase the frequency proximity of occupied data sub-carriers to occupied pilot sub-carriers in the burst. In order to simplify the frequency interpolation and enable the same repetition factors to be used on the pilot blocks as the data block, it is preferable to restrict the length of the pilot block (excluding the cyclic prefix) to be 1/K times the data block length (excluding the CP), with K preferably equal to 2.

Figure 4:
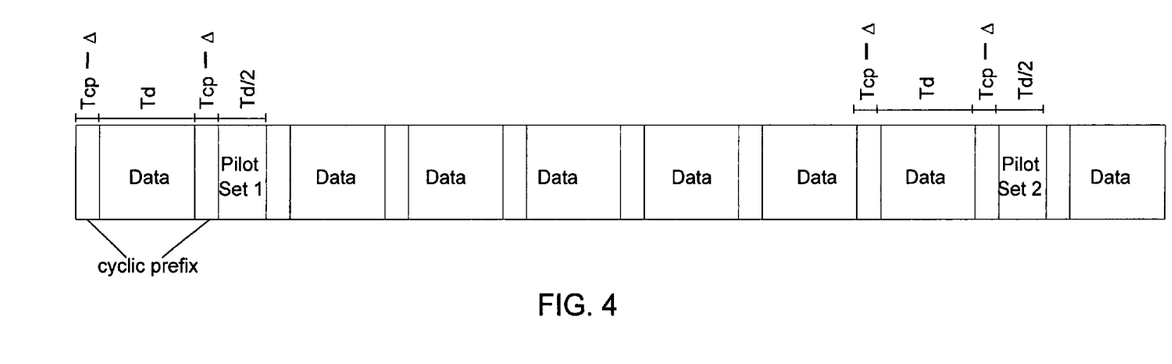
FIG. 4 shows pilot transmission and data transmission in a multi-carrier system.

An example of the preferred burst format is shown in FIG. 4. In FIG. 4, Td is the duration of a data block and K=2, so the duration of the pilot block is Td/2. The parameters used for characterizing the occupied sub-carriers of the IFDMA signal are the block length B, the repetition factor R, and the sub-carrier offset index S. The parameters are similar to a B-sub-carrier OFDM modulator, with sub-carrier mapping of evenly-spaced sub-carriers with spacing of R sub-carriers with a sub-carrier offset of S, for an DFT-SOFDM signal. These can be written as an ordered triplet: (B, R, S). In the example, the data blocks are configured as (Td, Rd, Sd). The first pilot block is configured as (Td/2, Rd, Sp1) and the second pilot is configured as (Td/2, Rd, Sp2). The cyclic prefix (CP) length is shown as (Tcp−Δ) to indicate that a burst (or sometimes called a frame or a subframe) that is originally designed for L full-length pilots can be reconfigured for a shortened pilot structure with KL short pilots by reducing the original CP length enough to generate L(K−1) additional CPs. For the case of two short pilots, one additional CP is needed since there is an additional block in the frame for L=1.

Figure 5:
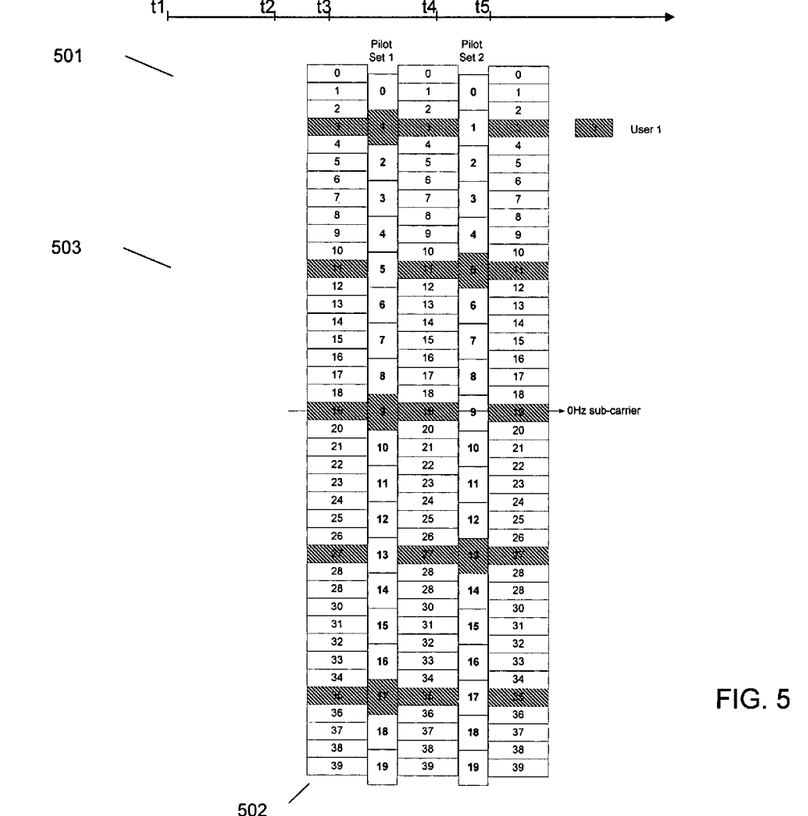
FIG. 5 shows pilot transmission and data transmission in a multi-carrier system.

While FIG. 4 shows the time domain format of the burst, the frequency domain description over time is shown in FIG. 5. For simplicity, FIG. 5 shows pilot and data transmission of a single user, with all transmissions by a single user being shaded. In FIG. 5, the data blocks are configured as (Td=40, Rd=8, Sd=3), the first pilot block (pilot set 1) is configured as (Td/2=20, Rd=8, Sd=1), and the second pilot block (pilot set 2) is configured as (Td/2=20, Rd=8, Sd=6). As one of ordinary skill in the art will recognize, transmissions by a particular user (e.g., User 1 in FIG. 5) will occupy several sub-carriers, as indicated by the shaded sub-carriers 503 (only one labeled) out of all the sub-carriers 501 (only one labeled). FIG. 5 is illustrated having total possible data block sub-carriers 0 through 39. Because the pilot channel block duration is less than the data channel block duration (see FIG. 4), each pilot sub-carrier 502 (only one labeled) takes up more bandwidth than does a data sub-carrier. For example, with K=2, a pilot subcarrier takes up twice as much bandwidth as a data subcarrier. Thus, fewer pilot sub-carriers can be transmitted within the available bandwidth than can data sub-carriers. FIG. 5 is illustrated having the total possible pilot sub-carriers 0 through 19, with User 1 occupying the shaded pilot sub-carriers (the remaining unshaded data and pilot sub-carriers can be utilized by other mobile units).

As mentioned above, changing the pilot pattern at least once in the burst serves to increase the frequency proximity of the occupied data sub-carriers to the occupied pilot sub-carriers. This is illustrated in FIG. 5, where at time t2 pilot symbols for a user are transmitted in a first pattern over a plurality of sub-carriers 0-19. As is evident, the pilot symbols have a symbol duration that differs from the data symbol duration. This results in each pilot sub-carrier having a greater bandwidth than each data sub-carrier.

At time t4, pilot symbols are transmitted for the user in a second pattern over a differing plurality of sub-carriers. This results in data sub-carriers having no pilot sub-carrier close (in frequency) at t1 to have proximate pilot sub-carriers (in frequency) at t3. For example, sub-carrier 503 had no pilot sub-carrier close at t1. However, because the pilot symbol pattern changed at t3, the data sub-carrier now has a pilot sub-carrier close in frequency. As a result, the base station receiving the burst illustrated in FIG. 5 from User 1 can now perform filtering/interpolation of the pilots from the two pilot blocks to recover channel estimates for all of the data sub-carriers occupied by User 1. The filtering/interpolation can be two-dimensional (frequency and time), or can be performed separately over frequency and then time, or for some channels with limited variation over the burst duration the two received pilot blocks can be treated as being received at the same time and a frequency interpolation/filtering can be performed on the composite of the occupied pilot subcarriers from the two received pilot blocks.

Figure 6:
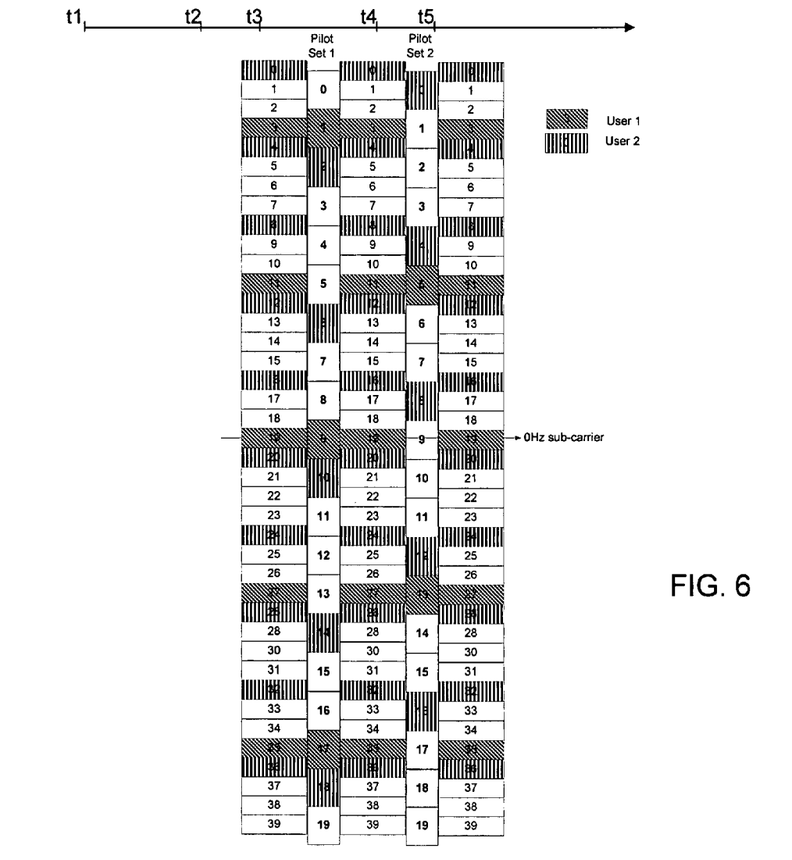
FIG. 6 shows pilot transmission and data transmission in a multi-carrier system.

The above transmission pattern can be extended to multiple users. This is illustrated in FIG. 6. In FIG. 6 User 1 occupies the same sub-carriers as in FIG. 5, but a second user (User 2) is also present in FIG. 6. For User 2, the data blocks are configured as (Td=40, Rd=4, Sd=0), the first pilot block (pilot set 1 with a first pattern) is configured as (Td/2=20, Rd=4, Sd=2), and the second pilot block (pilot set 2 with a second pattern) is configured as (Td/2=20, Rd=4, Sd=0). As indicated, User 2 has a different (smaller) repetition factor than User 1, so User 2 occupies a larger number of sub-carriers that User 1. The user's signals are orthogonal since they are on different sets of sub-carriers, and the base station can separate the users and perform channel estimation independently for each user. As shown in FIG. 6, the data sub-carriers that do not have a pilot symbol proximate in frequency during time period t2, will have proximate pilot symbols during time period t4, enabling filtering/interpolation at the base station to recover the channel estimates.

Figure 7:
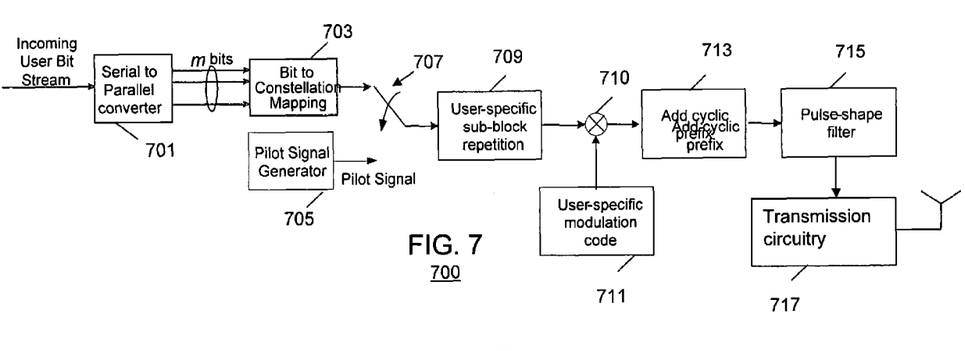
FIG. 7 is a block diagram of an IFDMA transmitter.

FIG. 7 is a block diagram of IFDMA transmitter 700 performing time-domain signal generation. During operation incoming data bits are received by serial to parallel converter 701 and output as m bit streams to constellation mapping circuitry 703. Switch 707 serves to receive either a pilot signal (sub-block) from pilot signal generator 705, or a data signal (sub-block) from mapping circuitry 703 of sub-block length, Bs. The length of the pilot sub-block is preferably smaller than that of the data sub-block. Regardless of whether pilot sub-block or data sub-block are received by user-specific sub-block repetition circuitry 709, circuitry 709 serves to perform sub-block repetition with repetition factor Rd on the sub-block passed from switch 707 to form a data block of block length B. Block length B is the product of the sub-block length Bs and repetition factor Rd and is different for pilot and data blocks, as was shown in FIG. 4. Data block and a user-specific modulation code 711 are fed to modulator 710. Thus, modulator 710 receives a symbol stream (i.e., elements of data block) and a user specific IFDMA modulation code (sometimes referred to as simply a modulation code). The output of modulator 710 comprises a signal existing at certain evenly-spaced frequencies, or sub-carriers, the sub-carriers having a specific bandwidth. The actual sub-carriers that signal utilizes is dependent upon the repetition factor Rd of the sub-blocks and the particular modulation code utilized. Changing the modulation code changes the set of sub-carriers, so changing the modulation code is equivalent to changing Sd. Varying the block length B, varies the specific bandwidth of each subcarrier, with larger block lengths having smaller sub-carrier bandwidths. It should be noted, however, that while changing the modulation code will change the sub-carriers utilized for transmission, the evenly-spaced nature of the sub-carriers remain. Thus, sub-carrier changing pilot pattern is achieved by changing the modulation code. In the preferred embodiment of the present invention the modulation code is changed at least once per burst as was shown in FIG. 5. Therefore, each time the modulation code is changed, the corresponding IFDMA pilot block occupies a different set of sub-carriers. A cyclic prefix is added by circuitry 713 and pulse-shaping takes place via pulse-shaping circuitry 715. The resulting signal is transmitted via transmission circuitry 717.

Transmitter 700 is operated so that transmission circuitry 717 transmits a plurality of data symbols over a first plurality of sub-carriers, each sub-carrier within the first plurality of sub-carriers has a first bandwidth. One example of this is the shaded subcarriers between t1 and t2 in FIG. 5, the shaded subcarriers between t3 and t4, and the shaded subcarriers beginning at t5. Transmission circuitry 717 transmits first pilot symbols at a first time for a user, the first pilot symbols are transmitted in a first pattern over a second plurality of sub-carriers. Each sub-carrier from the second plurality of sub-carriers has a second bandwidth. One example of this with the second bandwidth being different than the first bandwidth is the shaded subcarriers in the column Pilot Set 1 of FIG. 5 (between t2 and t3). In order to increase the frequency proximity of occupied data sub-carriers to occupied pilot sub-carriers, second pilot symbols are transmitted for the user at a second time. The second pilot symbols are transmitted in a second pattern over a third plurality of sub-carriers, each sub-carrier from the third plurality of sub-carriers having a third bandwidth. One example of this with the third bandwidth being the same as the second bandwidth is the shaded subcarriers in the column Pilot Set 2 of FIG. 5 (between t4 and t5).

Figure 8:
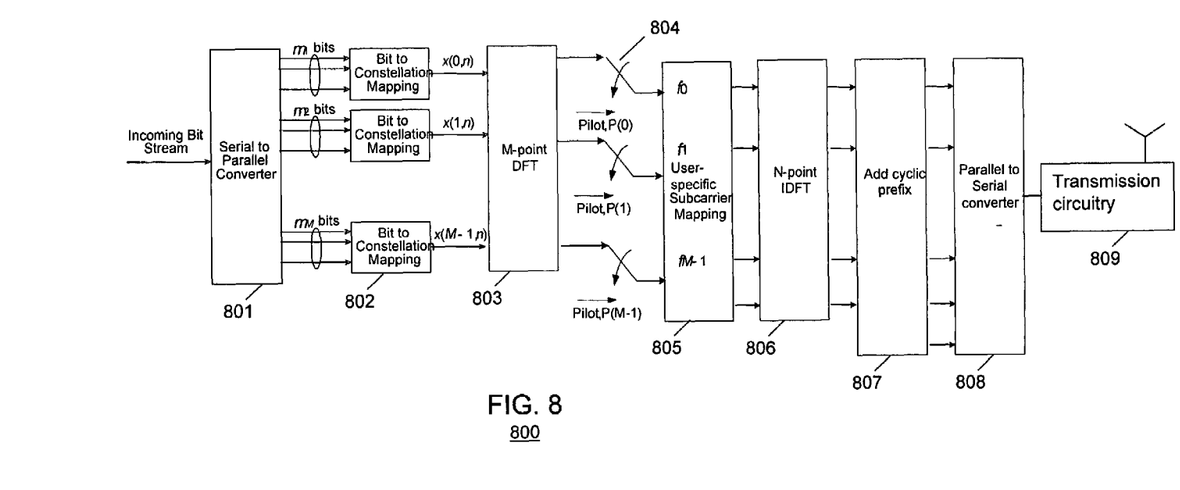
FIG. 8 is a block diagram of a DFT-SOFDM transmitter.

FIG. 8 is a block diagram of transmitter 800 used to transmit pilot symbols and data symbols in the frequency domain using a DFT-SOFDM transmitter. Blocks 801, 802, and 806-809 are very similar to a conventional OFDM/OFDMA transmitter, while blocks 803 and 805 are unique to DFT-SOFDM. As with conventional OFDM, the IDFT size (or number of points, N) is typically larger than the maximum number of allowed non-zero inputs. More specifically, some inputs corresponding to frequencies beyond the edges of the channel bandwidth are set to zero, thus providing an oversampling function to simplify the implementation of the subsequent transmission circuitry, as is known in the art. As described earlier, the present invention provides for different subcarrier bandwidths on pilot blocks than on data blocks, corresponding to different pilot block and data block lengths. In the transmitter of FIG. 8, different subcarrier bandwidths can be provided by different IDFT sizes (N) for pilot blocks and data blocks. For example, a data block may have N=512, and the number of usable subcarriers within the channel bandwidth may be B=384. Then, an example of a pilot block having a larger subcarrier bandwidth (and more specifically, a subcarrier bandwidth twice as large as a data block) is obtained by using N=512/2=256 for the pilot block, with the number of usable pilot subcarriers then being B=384/2=192. (Note that the example in FIG. 5 has a number of usable data subcarriers of 40, and a number of usable pilot subcarriers of 20.) The specific set of subcarriers out of the usable ones that are occupied by a data block or a pilot block are determined by the mapping block 805. To provide a low peak-to-average power ratio (PAPR), the occupied subcarriers for a particular transmission should have a constant separation; for example, an eight subcarrier separation is shown for the data blocks in FIG. 5, and an eight subcarrier spacing is shown for the pilot blocks in FIG. 5, where the pilot blocks have a subcarrier bandwidth twice as large as the subcarrier bandwidth of a data block. (In general, the occupied subcarrier separation can be as small as 1 subcarrier). The number of occupied subcarriers for a particular data block determines the size (or number of points M) of DFT 803 for that data block, whereas the number of occupied subcarriers for a particular pilot block determines the size (or number of points M) of DFT 803 for that pilot block. For example, a data block in FIG. 5 would have M=5. The inputs to DFT 803 for a data block are the M data symbols to be transmitted in that data block, which may be obtained by conventional conversion of a bit stream into a constellation-based symbol stream (e.g., QPSK, QAM, etc.), as in blocks 801-802. The pilot symbols to be transmitted in a particular pilot block can be provided to mapping block 805 either directly, as indicated by the switch 804, or by moving the pilots and switch 804 to the input of DFT 803 (not shown). In either case, it is preferable to select specific values for the pilot symbols that provide low PAPR of the transmitted pilot block as well as nearly constant amplitude on each of the occupied pilot subcarriers. One type of sequence that is well suited to these goals is the families of chirp-like sequences, such as CAZAC, generalized chirp-like sequences, and the like. As described, both the DFT size M and the IDFT size N may be smaller for a pilot block than a data block when the pilot subcarrier bandwidth is larger than the data subcarrier bandwidth.

The output of N-point IDFT OFDM modulator 806 comprises signal existing at certain evenly-spaced frequencies, or sub-carriers (with an allowable spacing as small as 1 sub-carrier which results in signal existing on adjacent sub-carriers). The actual sub-carriers that signal utilizes is dependent upon M and the particular sub-carrier mapping utilized. Thus, by changing the sub-carrier mapping, the set of occupied sub-carriers changes. The sub-carrier mapping can be changed by modulo-B addition on an offset factor. In the preferred embodiment of the present invention the pilot subcarrier mapping is changed at least once per burst. Therefore, at least one DFT-SOFDM pilot block occupies a different set of sub-carriers than another pilot block in the burst. A cyclic prefix is added by circuitry 807 followed by a parallel to serial converter 808. Also, although not shown, additional spectral shaping can be performed on the DFT-SOFDM signal to reduce its spectral occupancy or reduce its peak-to average ratio. This additional spectral shaping is conveniently implemented by additional processing before IDFT 806, and may for example be based on weighting or overlap-add processing.

Transmitter 800 is operated such that transmission circuitry 809 transmits a plurality of data symbols over a first plurality of sub-carriers, each sub-carrier within the first plurality of sub-carriers has a first bandwidth. One example of this is the shaded subcarriers between t1 and t2 in FIG. 5, the shaded subcarriers between t3 and t4, and the shaded subcarriers beginning at t5. Transmission circuitry 809 transmits first pilot symbols at a first time for a user, the first pilot symbols are transmitted in a first pattern over a second plurality of sub-carriers. Each sub-carrier from the second plurality of sub-carriers has a second bandwidth. One example of this with the second bandwidth being different than the first bandwidth is the shaded subcarriers in the column Pilot Set 1 of FIG. 5 (between t2 and t3). In order to increase the frequency proximity of occupied data sub-carriers to occupied pilot sub-carriers, second pilot symbols are transmitted for the user at a second time. The second pilot symbols are transmitted in a second pattern over a third plurality of sub-carriers, each sub-carrier from the third plurality of sub-carriers having a third bandwidth. One example of this with the third bandwidth being the same as the second bandwidth is the shaded subcarriers in the column Pilot Set 2 of FIG. 5 (between t4 and t5).

Figure 9:
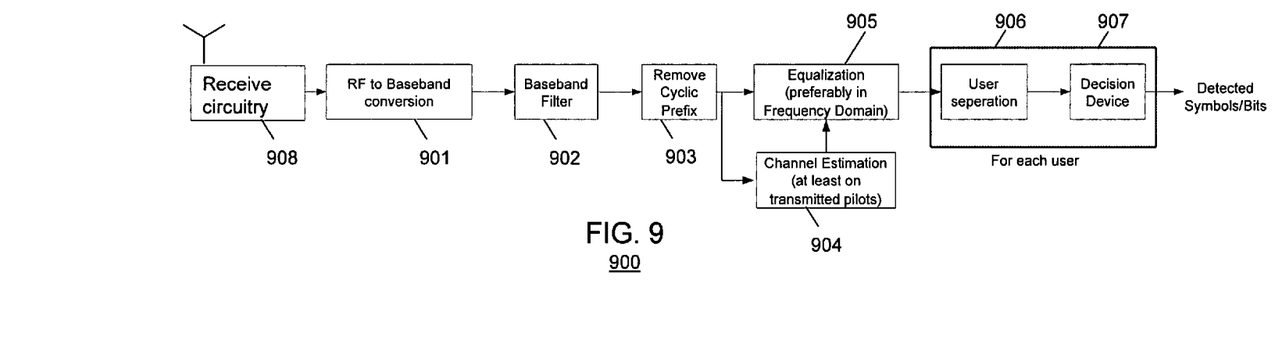
FIG. 9 is a block diagram of a receiver.

FIG. 9 is a block diagram of receiver 900. The received signal is a composite of the channel distorted transmit signal from all the active users. For a particular user, receive circuitry 908 receives a plurality of data symbols over a first plurality of sub-carriers, each sub-carrier within the first plurality of sub-carriers has a first bandwidth. receive circuitry 908 receives first pilot symbols at a first time for a user, the first pilot symbols are received in a first pattern over a second plurality of sub-carriers. Each sub-carrier from the second plurality of sub-carriers has a second bandwidth. In order to increase the frequency proximity of occupied data sub-carriers to occupied pilot sub-carriers, second pilot symbols are received for the user at a second time. The second pilot symbols are received in a second pattern over a third plurality of sub-carriers, each sub-carrier from the third plurality of sub-carriers has a third bandwidth.

During operation the received signal is converted to baseband by baseband conversion circuitry 901 and baseband filtered via filter 902. Once pilot and data information are received, the cyclic prefix is removed from the pilot and data blocks and the blocks are passed to channel estimation circuitry 904 and equalization circuitry 905. As discussed above, a pilot signal is commonly used for communication systems to enable a receiver to perform a number of critical functions, including but not limited to, the acquisition and tracking of timing and frequency synchronization, the estimation and tracking of desired channels for subsequent demodulation and decoding of the information data, the estimation and monitoring of the characteristics of other channels for handoff, interference suppression, etc. With this in mind, circuitry 904 performs channel estimation on the occupied sub-carriers for the data block utilizing at least received pilot blocks. The channel estimation preferably includes filtering/interpolation of the channel information from all of the occupied pilot subcarriers in a burst. The channel estimate is passed to equalization circuitry 905 so that proper equalization of the data blocks on the occupied sub-carriers may be performed.

The signal output from circuitry 905 comprises an appropriately equalized data signal that is passed to a user separation circuitry 906 where an individual user's signal is separated from the data signal. The user separation can be perfomed in time-domain or frequency-domain and can be combined with the equalization circuitry 905. Finally decision device 907 determines the symbols/bits from the user-seperated signal that were transmitter.

Figure 10:
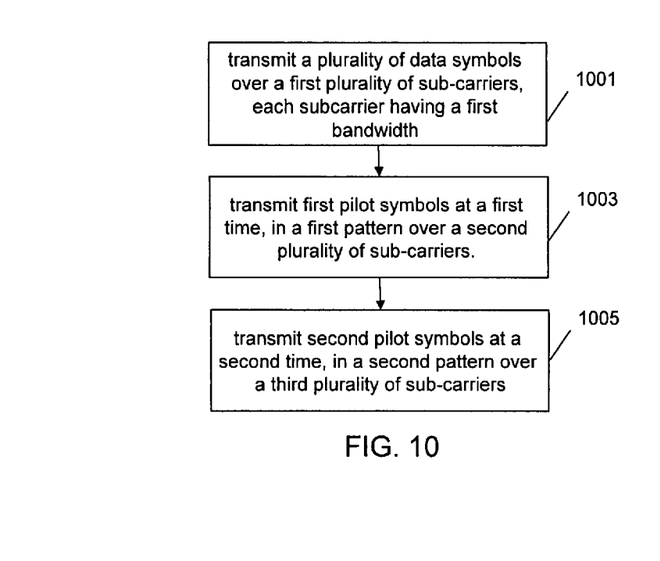
FIG. 10 is a flow chart showing operation of the transmitter of FIG. 7 and FIG. 8.

FIG. 10 is a flow chart showing operation of the transmitters of FIG. 7 and FIG. 8. The logic flow begins at 1001 where transmission circuitry transmits a plurality of data symbols over a first plurality of sub-carriers. As discussed above, each sub-carrier within the first plurality of sub-carriers has a first bandwidth. At step 1003 transmission circuitry transmits first pilot symbols at a first time for a user. As discussed above, the first pilot symbols are transmitted in a first pattern over a second plurality of sub-carriers. Each sub-carrier from the second plurality of sub-carriers has a second bandwidth differing from the first bandwidth. Finally, at step 1005 transmission circuitry transmits second pilot symbols for the user at a second time. The second pilot symbols are transmitted in a second pattern over a third plurality of sub-carriers. Each sub-carrier from the third plurality of sub-carriers has a third bandwidth.

Because the second pattern may differ from the first pattern, frequency proximity of occupied data sub-carriers to occupied pilot sub-carriers may be increased. More generally, the first pattern of pilot symbols may place the second plurality of sub-carriers within a predetermined frequency from a subset of the first plurality of sub-carriers, and the second pattern of pilot symbols may place the third plurality of sub-carriers within a predetermined frequency from a second subset of the first plurality of sub-carriers.

As discussed, the patterns of pilot symbols may differ in that they may be offset in frequency, such as a direct shift in frequency or a cyclic shift in frequency. Additionally, in a first embodiment of the present invention, the pilot subcarrier bandwidth does not change so that the third bandwidth and the second bandwidth are the same. However, in alternate embodiments of the present invention, pilot bandwidth may change, and in particular, the embodiment discussed below in FIG. 13, pilot bandwidth is allowed to vary, and may be set equal to the first bandwidth.

Figure 11:
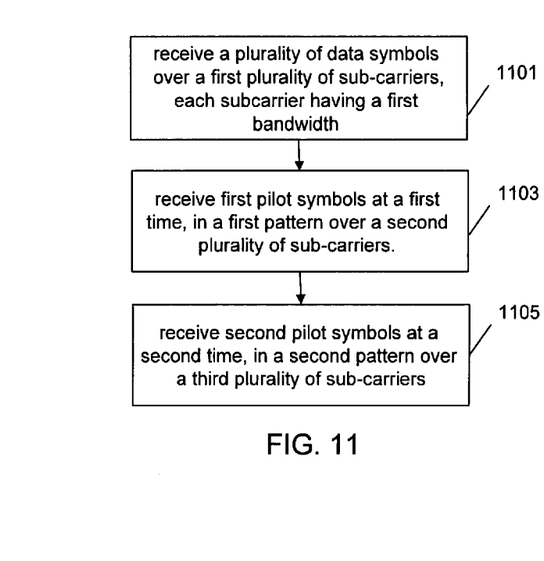
FIG. 11 is a flow chart showing operation of the receiver of FIG. 9.

FIG. 11 is a flow chart showing operation of the receiver of FIG. 9. The logic flow begins at 1101 where reception circuitry 908 receives a plurality of data symbols over a first plurality of sub-carriers. As discussed above, each sub-carrier within the first plurality of sub-carriers has a first bandwidth. At step 1102 reception circuitry receives first pilot symbols at a first time. As discussed above, the first pilot symbols are received in a first pattern over a second plurality of sub-carriers. Each sub-carrier from the second plurality of sub-carriers has a second bandwidth differing from the first bandwidth. Finally, at step 1103 reception circuitry receives second pilot symbols at a second time. The second pilot symbols are received in a second pattern over a third plurality of sub-carriers. Each sub-carrier from the third plurality of sub-carriers has a third bandwidth.

Figure 12:
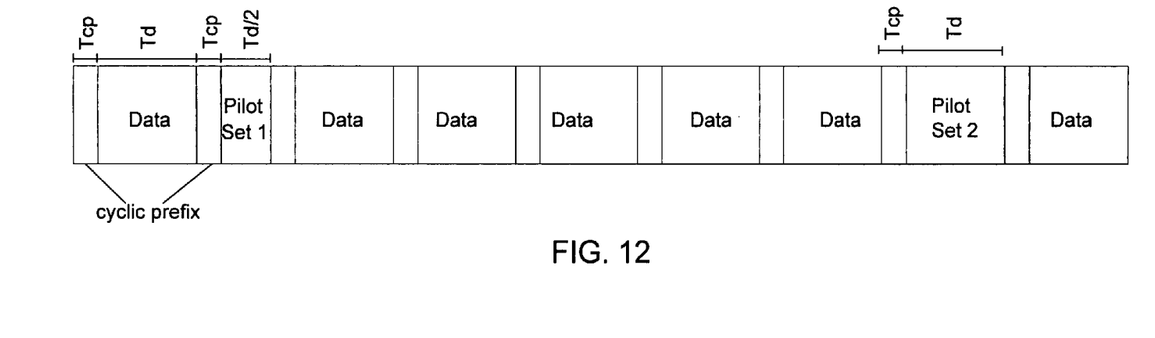
FIG. 12 illustrates a pilot configuration with differing pilot block lengths.

Although the preferred embodiment of the present invention uses the same block length and repetition factor (for IFDMA) or sub-carrier mapping (for DFT-SOFDM) for each of the pilot blocks within a burst, alternate embodiments may use a plurality of block lengths and/or a plurality of repetition factors and/or sub-carrier mappings for the plurality of pilot blocks within a burst. Note that different bock lengths provide different sub-carrier bandwidths, which may further enhance the channel estimation capability. FIG. 12 shows an example of an alternate embodiment where the second pilot block uses a different block length than the first pilot block. In this example, the length of the second pilot block is the same as the length of a data block. In addition, although the spacing between occupied subcarriers was shown to be the same (in terms of subcarriers, not bandwidth) for data and pilot blocks in FIG. 5, the invention is not limited to that configuration. For example, if a transmitted has multiple antennas it may use a larger spacing (in subcarriers) for pilot transmissions than data transmissions, so that the pilot subcarriers from multiple antennas may all be transmitted in the same pilot block interval (on different sets of subcarriers). Or a transmitter (single or multiple antenna) may be allocated a larger spacing (in subcarriers) to free-up more pilot resources for use by other transmitters.

An additional method for improving overall pilot efficiency for the uplink is to adapt the number of pilot blocks in a frame according to the current channel conditions (such as rate of channel variation) or transmit antenna configuration (such as 2 transmit antennas), or modulation. However, the changing of the number of pilot blocks in a burst independently or arbitrarily among users can lead to a breakdown of the orthogonality between the transmissions of different users. An alternate embodiment of the present invention resolves the problem by first defining a baseline burst format (such as the format of FIG. 4) and then allowing one (or more) of the remaining data blocks to be dynamically removed and replaced by one (or more) pilot block having the same length as the removed data block.

Figure 13:
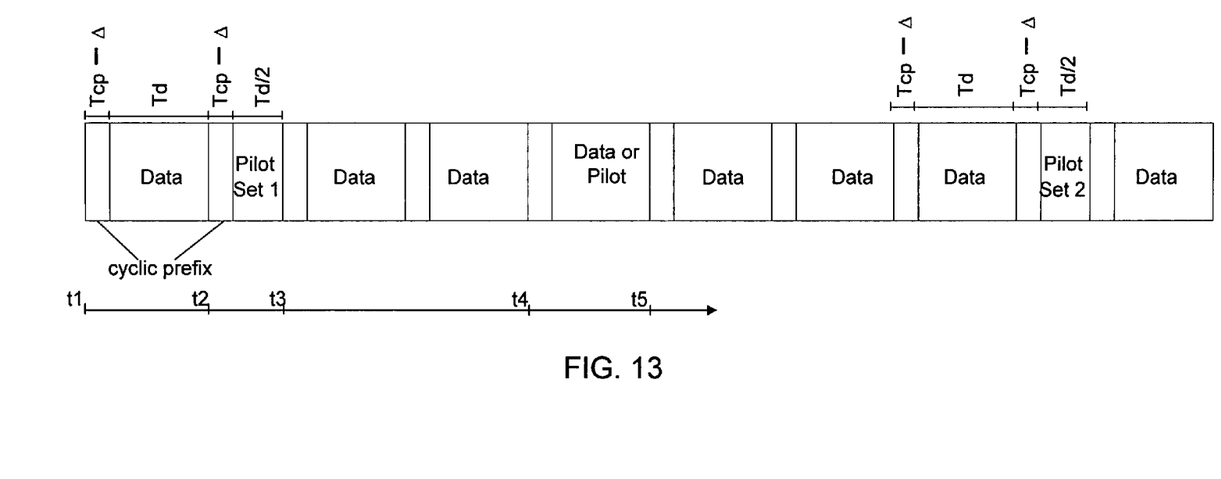
FIG. 13 illustrates two selectable pilot configurations.

FIG. 13 shows an example of this alternate embodiment providing two selectable pilot configurations for different channel conditions. The first is obtained by using the block labeled Data or Pilot for data transmission, and the second is obtained by using that block for an additional pilot block transmission. Note that the first example pilot configuration contains two short pilot block in the burst or frame, which is typically sufficient for low to high Doppler channels, or for low-order modulations such as R=½ QPSK even at extremely high Doppler. The second pilot configuration contains an additional full-length pilot block, which provides enhanced performance for extremely high mobility channel conditions. In addition, this format can more easily support orthogonal transmit pilots for multiple transmit antennas, such as using the additional pilot to provide orthogonal pilots for a larger number of transmit antennas. Orthogonality can be provided by using different sets of pilot sub-carriers for each antenna (FDM), or different cyclic shifts of a pilot sequence on different antennas, or by assigning different pilot blocks to different antennas (TDM), or by orthogonal coding over the multiple pilot blocks (e.g., Walsh encoding or CDM), or by various combinations of these.

The pilot configuration for a burst (e.g., the first or second configuration of FIG. 13) is preferably assigned by the base station dynamically based on channel conditions, such as the rate of channel variations (Doppler), but the assignment can be based on requests from the mobile unit, or on uplink measurements made by the base unit from previously received uplink transmissions.

Since FIG. 13 does not change the block length of the block that is dynamically or selectively used for either a data block or an additional pilot block (e.g., the block pilot or data in FIG. 13), different mobile units can be assigned different pilot configurations independently while still allowing orthogonal IFDMA/DFT-SOFDM multiplexing of the different users through different IFDMA code assignments/DFT-SOFDM sub-carrier mappings (note that changing the block length of a block that is selectively used for either a data block or an additional pilot block independently among users could destroy the orthogonality between users since the time alignment between the blocks of different users will be lost). In FIG. 13, the block length and subcarrier bandwidth of the additional pilot block that is present in the second configuration match the block length and subcarrier bandwidth of the other remaining data blocks.

Figure 14:
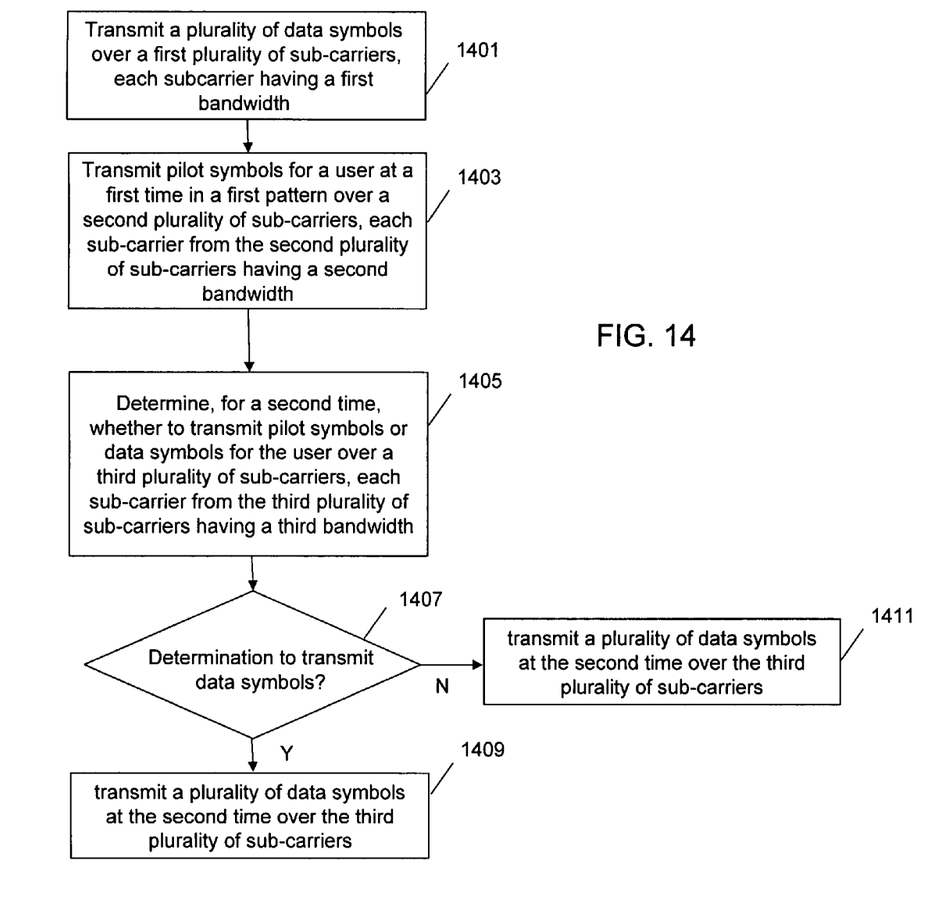
FIG. 14 is a flow chart of an alternate embodiment of the invention.

This alternate embodiment is summarized in FIG. 14, In step 1401 a plurality of data symbols are transmitted over a first plurality of sub-carriers (such as the data block from t1 to t2 in FIG. 13), each sub-carrier within the plurality of sub-carriers having a first bandwidth. In step 1403, pilot symbols are transmitted for a user at a first time in a first pattern over a second plurality of sub-carriers, each sub-carrier from the second plurality of sub-carriers having a second bandwidth (such as pilot set 1 from t2 to t3 in FIG. 13), Step 1405 determines, for a second time (such as the time from t4 to t5 where the block "data or pilot" is located in FIG. 13), whether to transmit pilot symbols or data symbols for the user over a third plurality of sub-carriers, each sub-carrier from the third plurality of sub-carriers having a third bandwidth. In FIG. 13, the third bandwidth is equal to the first bandwidth (since as described the block length and subcarrier bandwidth of the additional pilot block that is present in the second configuration match the block length and subcarrier bandwidth of the other remaining data blocks), but other burst configurations may be also be used, preferably wherein the first the second, and the third bandwidths are not all equal (i.e., preferably, at most any two out of the three are equal). An example different from FIG. 13 where the first the second, and the third bandwidths are not all equal is a burst format containing a pilot block having a subcarrier bandwidth of SB1, one or more data blocks also having a subcarrier bandwidth of SB1, and one or more blocks of subcarrier bandwidth SB2, where one of the blocks of subcarrier bandwidth SB2 is used for selectively transmitting either pilot symbols or data symbols based on the determination of step 1405-1407. Returning to FIG. 14, if the determination is made to transmit data symbols (step 1407), step 1409 transmits a plurality of data symbols at the second time over the third plurality of sub-carriers, or if the determination is made to transmit pilot symbols, step 1411 transmits pilot symbols for a user in a second pattern at the second time over the third plurality of sub-carriers. In the example of FIG. 13 the third bandwidth is the same as the first bandwidth since the block length is the same as for the other data blocks in a burst.

As described, the determination may be based on a channel condition such as Doppler frequency or on a number of antennas used for transmitting data symbols, and the determination can be made by the base unit, or by a mobile unit which then sends a corresponding request to the base unit. In systems with a scheduled uplink, the base unit can then assign the appropriate pilot format to the mobile unit for the subsequent transmissions from the mobile unit.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for pilot transmission, the method comprising the steps of:
   transmitting a plurality of data symbols over a first plurality of sub-carriers, each sub-carrier within the first plurality of sub-carriers having a first bandwidth;
   transmitting first pilot symbols at a first time for a user, the first pilot symbols transmitted in a first pattern over a second plurality of sub-carriers, each sub-carrier from the second plurality of sub-carriers having a second bandwidth; and
   transmitting second pilot symbols for the user at a second time, the second pilot symbols transmitted in a second pattern over a third plurality of sub-carriers, each sub-carrier from the third plurality of sub-carriers having a third bandwidth larger than the first bandwidth; and
   wherein the data symbols and the first and the second pilot symbols are not transmitted concurrently.

2. The method of claim 1 wherein the third bandwidth and the second bandwidth are the same.

3. The method of claim 1 wherein the first pattern differs from the second pattern.

4. The method of claim 3 wherein the first pattern differs from the second pattern in that the first and the second pattern are offset in frequency.

5. The method of claim 3 wherein the first pattern places the second plurality of sub-carriers within a predetermined frequency from a subset of the first plurality of sub-carriers, and the second pattern places the third plurality of sub-carriers within a predetermined frequency from a second subset of the first plurality of sub-carriers.

6. An apparatus comprising:
   transmission circuitry transmitting a plurality of data symbols over a first plurality of sub-carriers, each sub-carrier within the first plurality of sub-carriers having a first bandwidth, the transmission circuitry additionally transmitting first pilot symbols at a first time for a user, the first pilot symbols transmitted in a first pattern over a second plurality of sub-carriers, each sub-carrier from the second plurality of sub-carriers having a second bandwidth and transmitting second pilot symbols for the user at a second time, the second pilot symbols transmitted in a second pattern over a third plurality of sub-carriers, each sub-carrier from the third plurality of sub-carriers having a third bandwidth larger than the first bandwidth and wherein the data symbols and the first and the second pilot symbols are not transmitted concurrently.

7. The apparatus of claim 6 wherein the third bandwidth and the second bandwidth are the same.

8. The apparatus of claim 6 wherein the first pilot symbols for the user in the first pattern differ from the second pilot symbols for the user in the second pattern.

9. A method for pilot transmission, the method comprising the steps of:
   transmitting a plurality of data symbols over a first plurality of subcarriers, each subcarrier within the plurality of subcarriers having a first bandwidth;
   transmitting pilot symbols at a first time for a user in a first pattern over a second plurality of subcarriers, each sub-carrier from the second plurality of subcarriers having a second bandwidth;
   determining, whether to transmit pilot symbols or data symbols at a second time for the user over a third plurality of subcarriers;
   wherein the first and the second bandwidths are not equal; and
   if the determination is made to transmit data symbols, transmitting a plurality of data symbols at the second time over the third plurality of subcarriers, or
   if the determination is made to transmit pilot symbols, transmitting pilot symbols for the user in a second pattern at the second time over the third plurality of subcarriers having a third bandwidth larger than the first bandwidth.

10. The method of claim 9 wherein the determination is based on a channel condition.

11. The method of claim 10 wherein the channel condition comprises a Doppler frequency.

12. The method of claim 9 wherein the determination is based on a number of antennas used for transmitting data symbols.

13. The method of claim 1 further comprising the step of: spreading the data symbols.

14. The method of claim 9 further comprising the step of: spreading the data symbols.

15. A method for pilot transmission, the method comprising the steps of:
   transmitting a plurality of data symbols over a first plurality of sub-carriers, each sub-carrier within the first plurality of sub-carriers having a first bandwidth;

transmitting first pilot symbols at a first time for a user, the first pilot symbols transmitted in a first pattern over a second plurality of sub-carriers, each sub-carrier from the second plurality of sub-carriers having a second bandwidth; and transmitting second pilot symbols for the user at a second time, the second pilot symbols transmitted in a second pattern over a third plurality of sub-carriers, each sub-carrier from the third plurality of sub-carriers having a third bandwidth larger than the first bandwidth; and wherein the data symbols are DFT spread prior to transmitting over the first plurarity of sub-carriers; and wherein the data symbols and the first and the second pilot symbols are not transmitted concurrently.

16. The method of claim 15 wherein the first and the second pilot symbols are based on generalized chirp-like sequences.

17. The method of claim 15 wherein the first and the second pilot symbols are a cyclic shift of a pilot sequence.

18. The method of claim 15 wherein the first and second pilot symbols are orthogonally encoded by elements of an orthogonal code.

19. The method of claim 18 wherein the orthogonal code is a Walsh code.

\* \* \* \* \*